Dec. 16, 1969

D. J. BRIDGEFORD 3,484,433

STABILIZED STARCH XANTHATE

Filed Dec. 19, 1966

DOUGLAS J BRIDGEFORD
*INVENTOR.*

BY Neal J Mosely his attorney

Dec. 16, 1969  D. J. BRIDGEFORD  3,484,433
STABILIZED STARCH XANTHATE
Filed Dec. 19, 1966  3 Sheets-Sheet 2

DOUGLAS J BRIDGEFORD
INVENTOR.

BY
his attorney

United States Patent Office 3,484,433
Patented Dec. 16, 1969

3,484,433
STABILIZED STARCH XANTHATE
Douglas J. Bridgeford, Danville, Ill., assignor to Tee-Pak, Inc., a corporation of Illinois
Continuation-in-part of applications Ser. No. 416,795, Dec. 8, 1964, and Ser. No. 200,621, June 7, 1962. This application Dec. 19, 1966, Ser. No. 602,863
The portion of the term of the patent subsequent to Aug. 27, 1985, has been disclaimed
Int. Cl. C08b 19/04
U.S. Cl. 260—233.3                 8 Claims

ABSTRACT OF THE DISCLOSURE

A novel solid stable starch xanthate product is manufactured by spray drying solutions of starch xanthate. The product is in very finely divided particulate form and is easily redissolved in water. The degree of substitution (DS) and degree of polymerization (DP) are not critical in the preparation of a stable solid easily redissolved product. There is a slight loss of xanthate groups during the spray drying operation but the product is relatively stable for periods up to several months at room temperature and for a substantially indefinite period under refrigeration. The starch xanthate solution which is spray dried should have a relatively small amount of free alkali present. It is preferred to use starch xanthate solutions having a pH less than about 14 as originally prepared or which have been neutralized or decausticized to this range of alkalinity. The spray dried starch xanthate product can be redissolved to form solutions which are useful in the treatment of paper for improvement of wet and dry strength and other properties of the paper and for other uses for which starch xanthate solutions have been reported in the prior art.

CROSS REFERENCE TO RELATED APPLICATIONS

This application is a continuation-in-part of the co-pending applications of Douglas J. Bridgeford Ser. No. 416,795 filed Dec. 8, 1964 now Patent No. 3,399,069 and Ser. No. 200,621 filed June 7, 1962 now Patent No. 3,291,789.

BACKGROUND OF THE INVENTION

Starch xanthate, as a chemical composition, has been known in the literature for many years. Stern U.S. Patent 1,412,020 discloses the use of starch xanthate in glue compositions. Harrison U.S. Patent 1,684,732 discloses the use of starch xanthate as an intermediate in the preparation of films and filaments. Harrison U.S. Patent 1,680,020 discloses the oxidization of starch xanthates in the preparation of fibers and films. Brown U.S. Patents 2,629,493 and 2,629,494 disclose the use of starch xanthates as flotation agents in the separation of minerals. Russell et al. U.S. Patent 3,160,552 discloses the incorporation of starch xanthate in an oxidized cross linked form, i.e. as a xanthide, in admixture with a paper pulp slurry for use in the preparation of paper products having improved properties.

In recent years, a substantial amount of research and development work has been done at the Northern Regional Research Laboratory of the United States Department of Agricultural, at Peoria, Ill. on novel procedures for the preparation of starch xanthates and on the utilization of starch xanthates in paper products and insulating board. An improved continuous process for the preparation of starch xanthates is reported by Swanson et al. in IEC Product Research and Development 3, pp. 22–27. The starch xanthate product produced by the aforementioned process is thoroughly characterized in papers given before the American Chemical Society national meetings in September 1963 and April 1964, and published in 1965 in Die Starke. The utilization of starch xanthate in paper products is reported by Russell et al. in Tappi 45, pp. 557–566. The use of starch xanthate in insulating boards is reported by Naffziger et al. in Tappi 46, pp. 428–431.

The utilization of starch xanthates on a commercial scale by the paper industry and by other industries has been virtually non-existent. In spite of the excellent properties given to paper products by incorporation of starch xanthates therein, the industry has been very slow to take advantage of these properties because of the substantial instability of starch xanthate solutions. Starch solutions decompose quite rapidly, in a commercial sense. Starch xanthate in solution hydrolyzes and loses xanthate sulfur at a relatively high rate. A solution of starch xanthate loses approximately half of its xanthate sulfur content on storage at room temperature for about eight days. On more extended storage, viz. up to one month, starch xanthate solutions are almost completely decomposed. Most paper companies require a storage stability in paper additives of at least one month and preferably three months or more at room temperature. This degree of stability has never been obtainable with starch xanthate. The decomposition of starch xanthate solutions could be at least partially overcome by on-site manufacture and continuous utilization of the starch xanthate in the paper making process. Most paper companies however, are not interested in setting up a continuous manufacturing process for a chemical additive to be used in the manufacture of paper. If the additive is not sufficiently stable to be used under ordinary conditions of paper manufacture there is little or no interest in it. It has also been that the potential utilization of starch xanthate at any one paper mill is not large enough to justify the erection of a chemical plant adjacent to such mill for production and delivery of starch xanthate on a continuous basis.

In the co-pending application of Douglas J. Bridgeford Ser. No. 200,621 now Patent No. 3,291,789, a process is described for decausticizing solutions of various polymeric alcohol xanthates, such as viscose, amylose xanthate, etc. In the co-pending application of Douglas J. Bridgeford Ser. No. 416,795, now Patent No. 3,399,069, a process is described wherein the various decausticized solutions of polymeric alcohol xanthates are spray dried to produce a dry powder of the polymeric alcohol xanthate which is relatively stable at room temperature and which is stable almost indefinitely under refrigeration. In the spray drying of various polymeric alcohol xanthates it was found that a superior product is generally obtained when the xanthate solution is decausticized prior to spray drying. This invention is concerned with the extension of the concept of spray drying of polymeric alcohol xanthate solutions to the spray drying of starch xanthate solutions which are otherwise unstable.

SUMMARY OF THE INVENTION

This invention is concerned with the production of starch xanthate in a dry stable form which is easily redissolved for use in the various fields for which starch xanthate solutions have previously been evaluated. Starch xanthate may be prepared by any of a number of processes which are analogous to the preparation of viscose from cellulose. Starch is treated with alkali and converted to an alkali starch derivative which is in turn treated with carbon disulfide to produce the starch xanthate. The reaction is generally carried out in the form of a very concentrated solution or slurry. Starch xanthate may also be prepared on a continuous basis utilizing the procedures described in the aforementioned publications of the work done at the Northern Regional Laboratory of the U.S. Department of Agriculture. It has been found that starch xanthate solutions or slurries can be spray dried to produce a dry powder which is relatively stable at room temperature and which may be stored almost indefinitely under refrigeration. It has been found that the amount of free alkali in the starch xanthate slurry or solution must be kept at a relatively low value. The amount of free alkali may vary from about 0.01 to 2.0 mols per mol of starch xanthate, although it is preferred that the starch xanthate slurry or solution have a pH less than 14.0. When an excessive amount of alkali is present in the starch xanthate solution, as where the starch xanthate is prepared by a process closely analogous to the viscose process, there is a substantial decomposition of the xanthate groups during spray drying and a much more rapid decomposition of the xanthate powder on storage. Where stable dry powders of starch xanthates are to be prepared having a relatively low degree of substitution (DS) the amount of free alkali in the xanthate solution is usually within the range at which the solution can be spray dried without excessive decomposition. Where starch xanthates of higher DS are requried there tends to be a much higher proportion of free alkali present and it may be necessary to decausticize the solution prior to spray drying by the process of decausticization described in Douglas J. Bridgeford patent application Ser. No. 200,621 now Patent No. 3,291,789, although other processes of decausticization, such as dialysis and dilute or weak acid neutralization may be used. The spray dried starch xanthate product having a low alkali content is stable for extended periods of time. The product can be prepared at a xanthate sulfur level above that which is normally used in paper additives and will retain a sufficient xanthate sulfur content for utilization in the paper industry for periods of time up to two to three months at room temperature. This product can be stored for periods up to one year or more under refrigeration and still be usable as a paper additive.

BRIEF DESCRIPTION OF THE DRAWING

In the accompanying drawings, to be taken as a part of this specification, there are clearly and fully illustrated several examples of spray drying processes and/or apparatus which may be used in carrying out this invention, in which drawings.

DESCRIPTION OF SPRAY DRYING APPARATUS

Figure 1:
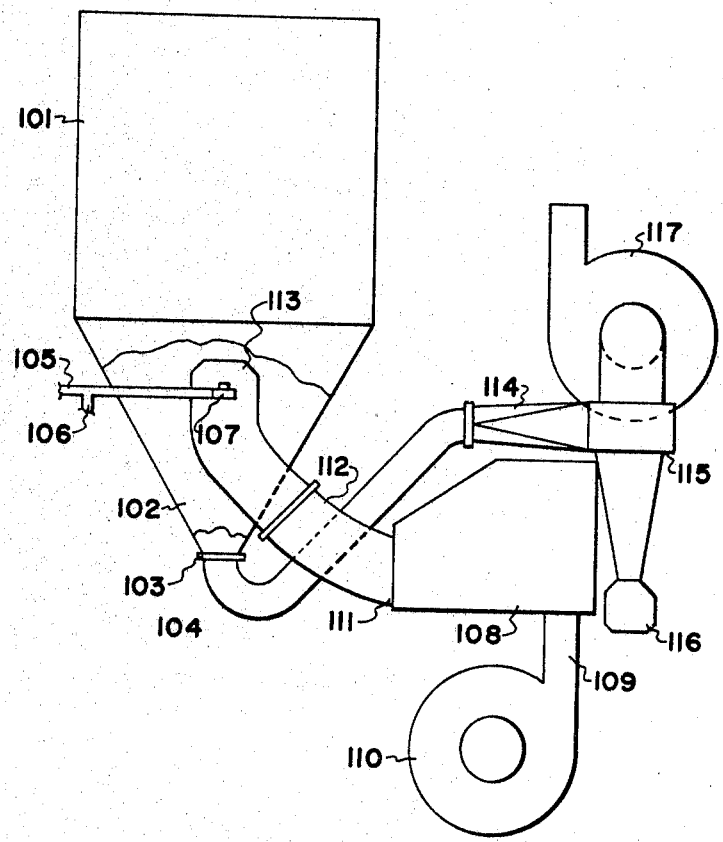
FIG. 1 is a diagrammatic view of a concurrent or parallel flow, up-flow type spray dryer.

In FIG. 1 there is shown a spray dryer which is supplied with the liquid to be dried from a pressure tank (not shown). The spray dryer includes drying chamber 101 having a conical outlet portion 102 opening through an outlet 103 to a collection conduit 104. The liquid feed is introduced into the dryer through inlet conduit 105 which is provided with inlet 106 for introduction of air or other gas to atomize the feed. Conduit 105 terminates at spray nozzle 107 in the dryer.

The dryer apparatus is provided with an air heater and filter 108 having inlet 109 connected to air supply fan 110 and an outlet 111 connected to conduit 112 which terminates at 113 in the dryer to provide a flow of heated air over the atomized solution which is to be dried.

Outlet conduit 104 from the base of the dryer is connected as at 114 to cyclone collector 115 which separates the dried powdered product from the air stream. Cyclone collector 115 is provided at its lower end with a product collection reservoir 116 and at its upper end is connected to exhaust fan 117.

The solution which is to be dried is placed in a supply tank from which it is forced under pressure to atomizing nozzle 107 in the dryer. A high pressure stream of air is introduced through inlet connection 106 and mixes with the solution in the atomizing nozzle. The air stream is effective to eject the solution in the form of a hollow cone shaped mist. The production rate of the apparatus is controlled by variation in pressure of the liquid feed and air streams.

Inlet fan 110 supplies air at room temperature (which may be predried) through filter and heater 108 which raises the air temperature to a value sufficient to dry the product being handled. The temperature of the air may range from 38° C. up to 316° C. or higher. The heated air is supplied through air inlet nozzle 113 in a blast which completely surrounds the cone shaped spray of liquid being treated. The atomized solution is carried upward in the drying chamber as a fine mist inside the blast of heated air.

As the cone shaped mist of solution mixes with the blast of hot air, the moisture is evaporated from the individual droplets. This evaporation of moisture causes the heated air stream to be cooled and maintains the surface temperature of the individual droplets at a level not substantially in excess of the wet bulb temperature of the air stream. The solid product in the spray, which are fine spherical particles, some of which are hollow, is protected from decomposition by the hot air stream by the reduction in temperature effected by evaporation of liquid from the particles.

The finely divided solid product and air are withdrawn from the drying chamber 101 through bottom outlet 103 and conduit 104. The air and product mixture passes into cyclone collector 115 where the solid product is separated and collected in product collection receptacle 116. The air stream from cyclone collector 115 is withdrawn by exhaust fan 117 and discharged to atmosphere.

Figure 2:
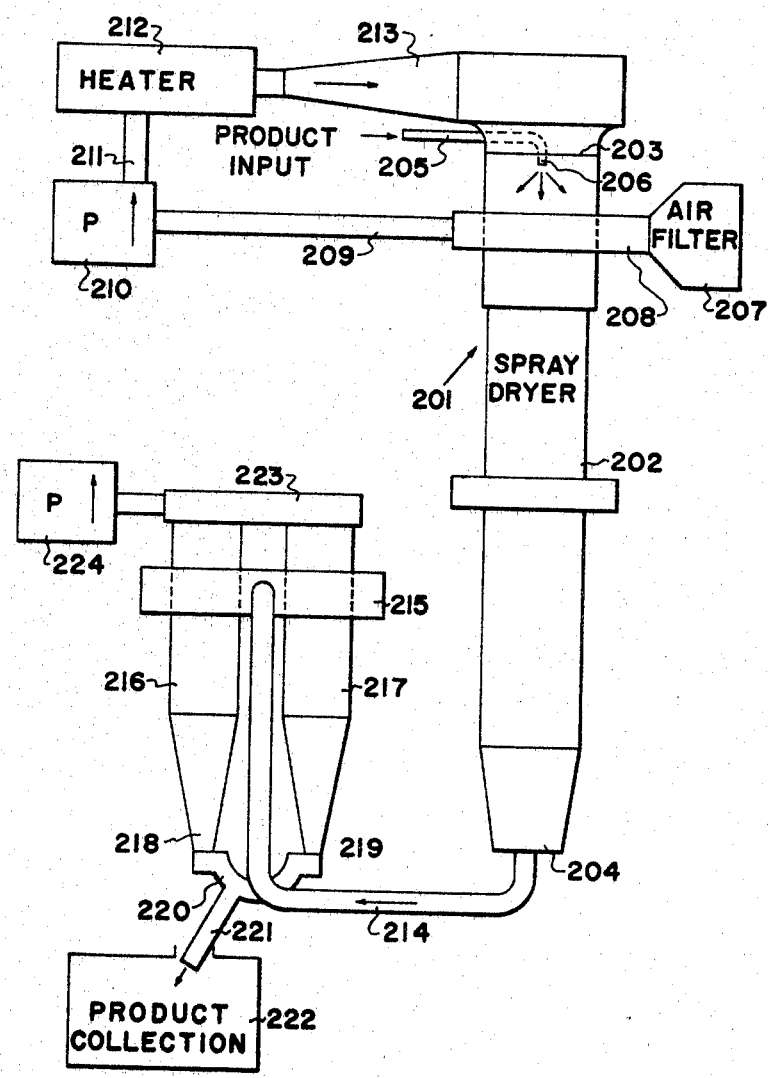
FIG. 2 is a diagrammatic view of a down-flow type, parallel flow spray dryer used in drying starch xanthate solutions in accordance with this invention.

In FIG. 2 there is shown a spray dryer apparatus of a commercial type which is used for large scale production of various spray dried food products and which is particularly useful in the preparation of stable, dry, polymeric alcohol xanthate powders. In FIG. 2 there is a diagrammatic showing of a spray dryer 201 comprising tubular chamber 202 having an upper inlet portion 203 and a lower outlet portion 204. A solution which is to be spray dried is introduced through conduit 205 and sprayed into the upper end of chamber 202 by an atomizing nozzle 206. Air for the spray dryer is supplied through filter 207 and manifold 208 surrounding the upper end of dryer chamber 202. Manifold 208 is connected by conduit 209 through blower 210. Blower 210 is in turn connected by conduit 211 to heater 212 which supplies heated air to the inlet 213 of spray dryer 201.

The bottom outlet 204 of spray dryer 201 is connected by conduit 214 to manifold 215 which feeds twin cyclones 216 and 217. Cyclones 216 and 217 have outlets 218 and 219 connected to manifold 220 and conduit 221 leading to a product collection receptacle 222. The upper end of cyclones 216 and 217 are connected to manifold 223 which is connected to blower 224 discharging to atmosphere.

The solution being treated is introduced into spray dryer 201 through conduit 205 and atomizing nozzle 206. The solution is discharged in the form of a conical spray of very fine droplets. Air is supplied by blower 210 and is filtered (and predried, if desired) and heated prior to introduction into spray dryer. The air is supplied at any suitable drying temperature in the range from about 38° C. up to 482° C. In the spray dryer the atomized particles of solution are quickly dried into small particles of spherical form (some of which are hollow). The evaporation of water (or other solvent) from the solution keeps the surface temperature of the dried particles at a value not substantially in excess of the wet bulb temperature of the heated air.

The flow of air and dried particulate product passes through conduit 214 into cyclones 216 and 217 where the product particles are separated and collected into receptacle 222. The air is then discharged to atmosphere through top or blower 224.

In FIGS. 3 to 7 of the drawings, there are shown examples of a number of different types of spray dryers which can be used in carrying out this invention.

Figure 3:
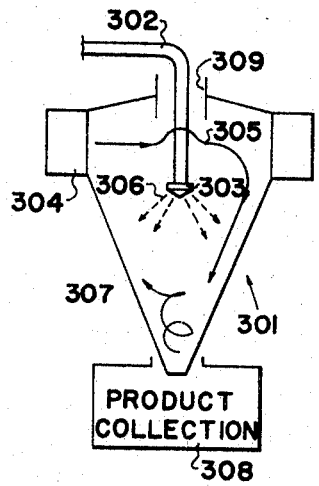
FIG. 3 is a diagrammatic view of a mixed-flow type spray dryer which can be used in drying starch xanthate solutions in accordance with this invention.

In FIG. 3 there is shown a mixed-flow type spray dryer 301. In this type of dryer, the solution to be treated is fed through conduit 302 and sprayed into the dryer through atomizing nozzle 303.

The feed flows countercurrently to the air and partial drying occurs while the spray mixes with the drying gases. Heated air (which may be predried) is fed into the dryer through inlet 304 and follows the path of the line and arrow 305. The flow path of atomized solution is shown by dotted lines and arrows 306.

Spray dryer 301 is constructed with the bottom portion 307 constructed as a separator and discharging to a product collection receptacle 308. The air is withdrawn through outlet 309 after separation from the solid particulate product.

In this type of dryer the initial flow of the atomized solution is concurrent to the inlet air and countercurrent to the exhaust flow of the air. Part of the drying takes place while the spray is passing through the ascending exhaust air and the drying is completed while the spray travels concurrently with the descending heated inlet air. The outlet air temperature of this type of dryer is in most cases considerably lower than for other types of dryers which increases the efficiency of treatment of thermally sensitive materials.

Figure 4:
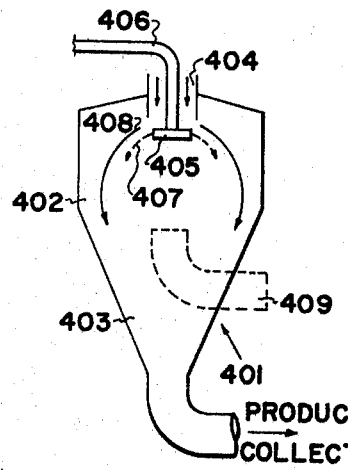
FIG. 4 is a diagrammatic view of another type of vertical, down-flow concurrent spray dryer.

In FIG. 4 there is shown a vertical down-flow concurrent type spray dryer. The dryer 401 has a main dryer portion 402 and a product collection portion 403 discharging to a product collection reservoir. Heated air (which may be predried) is introduced into dryer 401 through inlet 404 and flows past a spray of solution to be dried. The spray of solution is ejected at right angles to the air flow through nozzle 405 which is supplied by conduit 406 from the solution supply tank. The spray of solution being treated is shown by dotted lines and arrows 407 while the general path of heated air flow is shown by solid lines and arrows 408.

The heated air envelopes the spray of material being dried and causes water to evaporate rapidly to produce a finely divided dried product. The solid product is removed in the separation portion of the dryer and the air is withdrawn from the dryer through outlet conduit 409 shown in dotted lines.

Figure 5:
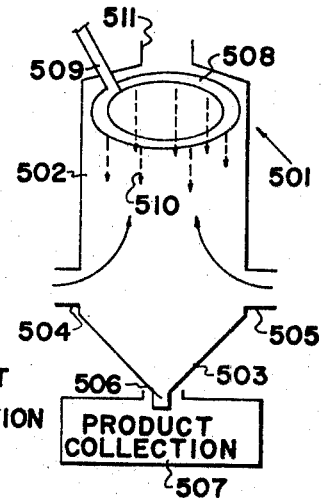
FIG. 5 is a diagrammatic view of a vertical, up-flow counter-current type spray dryer.

In FIG. 5 there is shown a vertical up-flow countercurrent type of spray dryer. Dryer 501 includes a dryer portion 502 and a collector portion 503. Dryer 501 is divided with inlets 504 and 505 for supplying heated air (which may be predried) countercurrently to the spray of liquid being treated. The collector portion 503 has an outlet 506 discharging into a product collection receptacle 507.

At the upper end of dryer 501 there is provided an atomizing nozzle 508 having a supply inlet conduit 509. Nozzle 508 is arranged to discharge a plurality of atomized streams of liquid as shown by dotted lines and arrows 510. At the upper end of the dryer there is provided an outlet opening 511 for withdrawal of gasses from the dryer.

The vertical up-flow countercurrent type of dryer is quite efficient in drying but results in product classification. The larger particles which are dried by the air circulating through the dryer fall to the bottom of the chamber and are withdrawn into the product collection receptacle. Very fine particles are carried out through outlet 511 and require separation in a secondary separation system (not shown).

Figure 6:
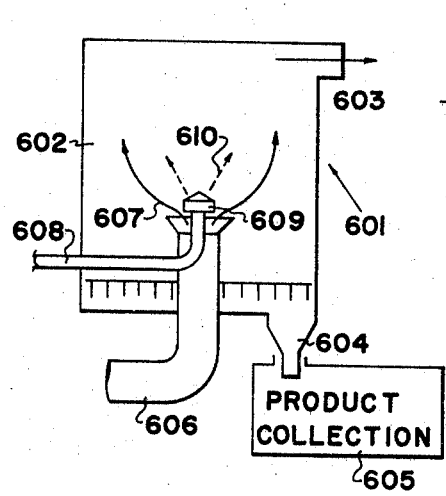
FIG. 6 is a diagrammatic view of a vertical up-flow concurrent type spray dryer.

In FIG. 6 there is shown a diagrammatic view of a vertical up-flow concurrent type of spray dryer. In this apparatus dryer 601 comprises dryer chamber 602 having outlet 603 for discharge of air and outlet 604 discharging to a product collection receptacle 605.

Heated air (which may be predried) is introduced into the dryer through conduit 606 as shown by solid lines and arrows 607. The liquid product to be treated is introduced through conduit 608 and atomized at nozzle 609 as shown by dotted lines and arrows 610.

In this type of dryer both the air and the atomized liquid to be treated enter at the bottom of the chamber. The liquid is sprayed in a form of a hollow cone which is enveloped by the heated air flowing through the dryer. The air is maintained at a temperature ranging from 38° C. up to 482° C. depending upon the product being treated. The up-flow of air results in product classification as the large particles fall to the bottom of the chamber and are removed to product collection receptacle 605 while the product fines are withdrawn with the air through outlet 603. This arrangement requires the use of a secondary separator system for recovery of product fines and to prevent air pollution.

Figure 7:
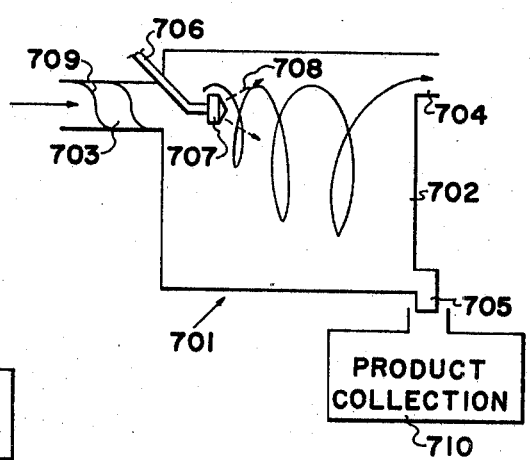
FIG. 7 is a diagrammatic view of a horizontal concurrent type spray dryer.

In FIG. 7 there is shown diagrammatically a horizontal concurrent type of spray dryer. Spray dryer 701 includes dryer chamber 702 having air inlet 703 and outlet 704 and product outlet 705.

The liquid being treated is introduced into the dryer through conduit 706 which atomizes the liquid through nozzle 707 in the form of a conical spray as indicated by dotted lines and arrows 708. The heated air (which may be predried) is introduced through inlet 702 and given a whirling motion by helical vanes 709.

In this type of dryer the liquid spray and air enter concentrically at the same end of the chamber. The air circulates around the spray of liquid particles in a whirling motion caused by helical vanes 709. The particles are quickly dried and settle to the bottom of the dryer where they are removed to the product collection receptacle 710. The air is withdrawn from the dryer through outlet 704. In this type of dryer the very fine product particles are carried out with the air and require a secondary separation system (not shown).

PREPARATION OF STARCH XANTHATES

The following non-limiting examples are illustrative of the preparation of starch xanthates and of the preparation of spray dried starch xanthates in accordance with this invention:

Example 1

Starch xanthate slurries having a degree of substitution (DS) of 0.12 to 0.16 were prepared using the procedure and apparatus described by Swanson et al. in I & EC Product Research and Development 3, 22–27. The procedure will be hereinafter referred to as the USDA process. Starch was passed through a model 50 Ko-Knader modified as described by Swanson et al. and admixed with alkali and carbon disulfide. The reaction was carried out for a period of two minutes to produce a semi-plastic starch xanthate extrudate. The extrudate was diluted to a slurry of 20% starch content. The starch xanthate which was produced in this manner had a DS ranging from 0.12 to 0.16.

Starch xanthate which was prepared in this manner was used in admixture with paper pulp replacing part of the wood pulp normally used in the paper furnish. The slurry was treated with oxidizing agents such as chlorine, iodine, nitrogen dioxide or nitrous acid to produce starch xanthide polymers as part of the paper structure. The slurries have also been treated with divalent metal salts such as zinc or cadmium salts to produce starch dixanthates of the heavy metal. Paper products which have been produced in this manner have superior wet and dry strength and superior fold and crease strength to papers which do not contain the starch xanthate products.

The starch xanthate which was prepared as described above suffers from the disadvantage that it is relatively unstable on storage. The starch xanthate produces the best results in paper pulps compositions when used at a DS in the range of 0.12 to 0.16. The practical limits of DS in handling this material for use in paper compositions ranges from about 0.08 to 0.20 (higher and lower DS xanthates can be used for other purposes). A starch xanthate having a DS at the upper limit of practical utilization or at the upper limit of the optimum range indicated decomposes within a few days to the point where the DS is well below the minimum value of the optimum range and in many cases is well below the minimum practical DS for utilization of the xanthate. For example, a portion of the starch xanthate was diluted to a 9.54% starch content and studies made of the rate of change in xanthate sulfur content and in viscosity over a period of time. The solution studied had an initial xanthate sulfur content of 5.1% (DS 0.12) and viscosity of 480 cps. (at 6 r.p.m.) or 346 cps. (at 60 r.p.m.). At the end of five days storage at 24° C. the starch xanthate slurry had decreased to an xanthate sulfur content of 3.3 (DS 0.08) and viscosity of 320 cps. (at 6 r.p.m.) or 268 cps. (at 60 r.p.m.). In three more days the xanthate sulfur content of the slurry had decreased to 2.7% (DS 0.06). After a storage period of about one month at 24° C. the xanthate sulfur content of a starch xanthate slurry is less than 1%, indicating almost complete decomposition of the xanthate. The decomposition of the starch xanthate results in a substantial reduction in the viscosity of the slurry and the reduction in xanthate sulfur content makes the starch xanthate essentially inoperable in paper pulp compositions.

Example 2

A portion of the starch xanthate slurry prepared in Example 1, having an initial xanthate sulfur content of 7% (DS 0.16) was passed through a spray dryer of the type described in FIG. 2 of the drawings. The dryer used was a DeLaval model 46–12 compact spray dryer designed for evaporation of 120 pounds water per hour. The starch xanthate was diluted to a starch content of 4% and was fed through the dryer at a rate of 120 pounds of solution per hour. The solution had an initial pH of 12.7 and an initial xanthate sulfur content of 7.0% (DS 0.16). The dryer was operated at an inlet temperature of 295° C. and an outlet temperature of 91° C. and an air circulation of 1100 c.f.m. (cubic feet per minute). Air velocities for the dryer are calculated at 100° C.

Under the above described conditions, there was obtained a finely divided dry yellow powder consisting of starch xanthate having a residual moisture content of about 5.8%. The powder which was obtained consisted of small spherical particles, some of which were solid and some of which were hollow spheres. The particles ranged from sub-micron size up to about 50 to 60 microns in diameter. The powder which was obtained from the spray dryer had an initial xanthate sulfur content of 6.63% (DS 0.15). At the end of seven days storage at room temperature (22–27° C.) the xanthate sulfur content of the powder had decreased to 6.13% (DS .135). This may be compared with the untreated slurry which decomposed and lost approximately half of its xanthate sulfur content in eight days. This powder was stored for 82 days at room temperature, at the end of which time the xanthate sulfur content had dropped to 4.15% (DS 0.08). This same powder had less than 0.5% decrease in xanthate sulfur content after 80 days' storage at 0° C. Continued studies on the storage stability of the powder have shown that it may be stored for periods of six months to one year or more while retaining a sufficient sulfur content to remain in the optimum desired range for use of the starch xanthate in paper pulp compositions.

The spray dried starch xanthate powder which was produced in this example was redissolved in water and mixed in paper pulp compositions following the procedure described by Russell et al. in Tappi, 45, 557–566, and the paper products which were produced had properties equal to or superior to those reported in the aforementioned publication.

Example 3

A starch slurry prepared as in Example 1, having an initial xanthate sulfur of 8% (DS 0.185) is diluted to 4% starch content and spray dried in an apparatus as shown and described in FIG. 1 of the drawings. The apparatus is operated at an inlet temperature of 325° C. and an outlet temperature of 95° C. Air is circulated through the apparatus at a rate of 1500 c.f.m.

The product which is obtained from this spray dryer consists of finely divided starch xanthate powder consisting of small spherical particles, some of which are hollow spheres. The particle size ranges from sub-micron size to 50 to 100 microns in diameter. The powder has an xanthate sulfur content of about 7.5% and is sufficiently stable for comercial use for 90 days at room temperature. The powder may be stored almost indefinitely under mild refrigeration. When this powder is redissolved in water it is useful for treatment for paper pulp as described in the aforementioned Russell et al. publication.

Example 4

A starch slurry prepared as in Example 1, having an initial xanthate sulfur content of 7.5% (DS 0.17) is diluted to 4% starch content and spray dried in an apparatus as shown and described in FIG. 3 of the drawings. The apparatus is operated at an inlet temperature of 300° C. and an outlet temperature of 100° C. Air is circulated through the apparatus at a rate of 1400 c.f.m.

The product which is obtained from this spray dryer consists of finely divided starch xanthate powder consisting of small spherical particles, some of which are hollow spheres. The particle size ranges from sub-micron size to 50 to 100 microns in diameter. The powder has an xanthate sulfur content of about 7% and is sufficiently stable for commercial use for 90 days at room temperature. The powder may be stored almost indefinitely under mild refrigeration. When this powder is redissolved in water it is useful for treatment for paper pulp as described in the aforementioned Russell et al. publication.

Example 5

A starch slurry prepared as in Example 1, having an initial xanthate sulfur content of 7% (DS 0.16) is diluted to 4% starch content and spray dried in an apparatus as shown and described in FIG. 4 of the drawings. The apparatus is operated at an inlet temperature of 280° C. and an outlet temperature of 90° C. Air is circulated through the apparatus at a rate of 1200 c.f.m.

The product which is obtained from this spray dryer consists of finely divided starch xanthate powder consisting of small spherical particles, some of which are hollow spheres. The particle size ranges from sub-micron size to 50 to 100 microns in diameter. The powder has an xanthate sulfur content of about 6.5% and is sufficiently stable for commercial use for 90 days at room temperature. The powder may be stored almost indefinitely under mild refrigeration. When this powder is redissolved in water it is useful for treatment for paper pulp as described in the aforementioned Russell et al. publication.

Example 6

A starch slurry prepared as in Example 1, having an initial xanthate sulfur content of 7% (DS 0.16) is diluted to 5% starch content and spray dried in an apparatus as shown and described in FIG. 5 of the drawings. The apparatus is operated at an inlet temperature of 275° C. and an outlet temperature of 90° C. Air is circulated through the apparatus at a rate of 1200 c.f.m.

The product which is obtained from this spray dryer consists of finely divided starch xanthate powder consisting of small spherical particles, some of which are hollow spheres. The particle size ranges from sub-micron size to 50 to 100 microns in diameter. The powder has an xanthate sulfur content of about 6.5% and is sufficiently stable for commercial use for 90 days at room temperature. The powder may be stored almost indefinitely under mild refrigeration. When this powder is redissolved in water it is useful for treatment for paper pulp as described in the aforementioned Russell et al. publication.

Example 7

A starch slurry prepared as in Example 1, having an initial xanthate sulfur content of 8% (DS 0.185) is diluted to 5% starch content and spray dried in an apparatus as shown and described in FIG. 6 of the drawings. The apparatus is operated at an inlet temperature of 260° C. and an outlet temperature of 85° C. Air is circulated through the apparatus at a rate of 1200 c.f.m.

The product which is obtained from this spray dryer consists of finely divided starch xanthate powder consisting of small spherical particles, some of which are hollow spheres. The particle size ranges from sub-micron size to 50 to 100 microns in diameter. The powder has an xanthate sulfur content of about 7.5% and is sufficiently stable for commercial use for 90 days at room temperature. The powder may be stored almost indefinitely under mild refrigeration. When this powder is redissolved in water it is useful for treatment for paper pulp as described in the aforementioned Russell et al. publication.

Example 8

A starch slurry prepared as in Example 1, having an initial xanthate sulfur content of 7% (DS 0.16) is diluted to 5% starch content and spray dried in an apparatus as shown and described in FIG. 7 of the drawings. The apparatus is operated at an inlet temperature of 275° C. and outlet temperature of 90° C. Air is circulated through the apparatus at a rate of 1300 c.f.m.

The product which is obtained from this spray dryer consists of finely divided starch xanthate powder consisting of small spherical particles, some of which are hollow spheres. The particle size ranges from sub-micron size to 50 to 100 microns in diameter. The powder has an xanthate sulfur content of about 6.5% and is sufficiently stable for commercial use for 90 days at room temperature. The powder may be stored almost indefinitely under mild refrigeration. When this powder is redissolved in water it is useful for treatment for paper pulp as described in the aforementioned Russell et al. publication.

Example 9

In this and several succeeding examples tests were carried out in accordance with the procedure described in Example 2 using starch xanthate solutions having different degrees of alkalinity to determine the effect of pH on the process. In the co-pending application of Douglas J. Bridgeford Ser. No. 416,795 now Patent No. 3,399,069, it was necessary to neutralize or decausticize cellulose xanthate and certain other polymeric alcohol xanthates to a pH less than about 13 in order to spray dry these materials effectively and produce a storage stable product.

In one experiment the effect of spray drying a starch xanthate solution of higher alkali content was evaluated. The starch xanthate solution produced in Example 1, having an initial xanthate sulfur content of 6.75% and pH of 12.5 was modified by addition of sufficient alkali to raise the pH to 13.4. The solution was spray dried in the apparatus described in Example 2 at a solution feed rate (4.2% solids) of 96 pounds per hour. The spray dryer was maintained at an inlet temperature of 218° C. and outlet temperature of 93° C. while circulating air at a velocity of 1100 c.f.m.

The powder which was recovered from the spray dryer in this experiment had an xanthate sulfur content of 5.53% (representing a substantial loss of xanthate sulfur in the spray drying operation). The starch xanthate powder was a finely divided product having a 10% residual moisture content. The powder was evaluated in an accelerated aging or decomposition test at 50° C. The powder lost approximately 50% of its xanthate sulfur content in two days while the spray dried pH 12.5 starch xanthate powder required three to four days at 50° C. to lose 50% of its xanthate sulfur content.

Example 10

In another experiment the spray drying of starch xanthate was carried out under the conditions described in Example 9. In this experiment however the starch xanthate was rendered more alkaline by addition of sodium hydroxide to raise the pH to 13.7. The amount of uncombined sodium hydroxide was about 50% of the weight of the starch. The pH 13.7 starch xanthate solution was diluted to a 4.2% solids content solution and spray dried under the conditions set forth in Example 9. The feed had an xanthate sulfur content of 6.75% while the product recovered from the spray dryer consisted of a finely divided dry powder having a residual moisture content of 14% and an xanthate sulfur content of 2.16%. Thus, it is seen that approximately two-thirds of the xanthate sulfur was lost in the spray drying of the starch xanthate solution.

The starch xanthate powder having an xanthate sulfur content of 2.14% was evaluated in an accelerated aging test at 50° C. as described in Example 9. This powder lost more than 50 of its xanthate sulfur content after one day's storage at 50° C.

Example 11

In this and succeeding examples, starch xanthate was decausticized by various techniques to reduce the pH substantially below the level of about 12.5 used in the experiments reported in Examples 2 to 8. The decausticization may be carried out using any of the techniques reported in the prior art which are not severe enough to decompose the starch xanthate. The starch xanthate solution may be decausticized by dialysis, cation exchange and/or anion exchange, weak or dilute acid neutralization, etc. Several of these procedures are described in detail in the co-pending application of Douglas J. Bridgeford Ser. No. 200,621 now Patent No. 3,291,789.

In this example starch xanthate prepared in accordance with Example 1 having an initial pH of 12.7 and xanthate sulfur content of 6.5 was diluted to a 7% starch content solution and decausticized by cation exchange. The solution was passed through a cation exchanger in the acid form (Dowex 50WX-8H) and a solution obtained having a pH of 8.5.

An attempt was made to spray dry the 7% starch xanthate solution which was unsuccessful as a result of plugging of the spray nozzle. The solution was then diluted to a 4% starch content and spray dried in the apparatus as described in Example 2. The dryer was operated at an inlet temperature of 295° C., outlet temperature of 91° C. and air circulation rate of 1100 c.f.m. The product which was obtained from the spray dryer was a finely divided starch xanthate powder having an initial xanthate sulfur content of 5.67% and moisture content of 6.30%. This product had a lower initial xanthate sulfur content (possibly due to the several hours aging at room temperature subsequent to the ion exchange treatment and before spray drying) than the spray dried starch xanthate which was not decausticized but decomposed at a somewhat slower rate than the caustic containing starch xanthate powder. The rate of decomposition of the decausticized starch xanthate is somewhat higher during the spray drying process and during the first few hours of storage at room temperature but the rate of decomposition on extended storage is somewhat less than the caustic containing starch xanthate powder. The decausticized starch xanthate powder can be made satisfactory for use in paper pulp compositions in accordance with the process of Russell et al. by using a higher DS starch xanthate solution as the feed to the spray dryer. If a starch xanthate solution is used having an initial xanthate sulfur content of about 7.5% and is decausticized to about pH 8.5 by cation exchange the product which is obtained retains an xanthate sulfur content in the range above 5% for periods of storage at room temperature up to 90 days.

Example 12

The procedure described in Example 11 was repeated using Amberlite IR 120H as the cation exchange resin. The starch xanthate solution was decausticized to pH 8.5 and on spray drying under the conditions described in Example 11 was found to produce a yellow finely divided starch xanthate powder which is stable on storage for extended periods at room temperature.

Example 13

A starch xanthate solution was prepared and diluted as described in Example 11. The solution was decausticized by mixing with a sufficient amount of Dry Ice to convert substantially all of the free alkali to carbonate. The neutralized starch xanthate solution was spray dried to produce a powder which was stable on storage for extended periods of time at room temperature.

Example 14

The procedure of Example 13 was repeated using glacial acetic acid or 15 N acetic acid to neutralize the starch xanthate solution. The glacial acetic acid reduced the pH of the starch xanthate solution to 7.8. The 15 N acetic acid reduced the pH of the starch xanthate solution 8.5. In each case the solution was spray dried and a solid yellow finely divided powder obtained which was stable on extended storage at room temperature.

Example 15

A starch xanthate solution is prepared as described in Example 11 and diluted to 4% starch content. The solution is decausticized by dialysis following the procedure described in the patent application of Douglas J. Bridgeford Ser. No. 200,621 now Patent No. 3,291,789. The solution may be dialyzed against distilled water or against a solution containing a cation exchange resin in the acid form to accelerate the migration of sodium ions from the starch xanthate solution. The solution may be decausticized to about pH 9 using this procedure and is spray dried at the conditions indicated in Example 11 to produce a yellow finely divided dry powder which is stable for extended periods of storage at room temperature.

Example 16

Starch xanthate is prepared as described in Example 1 at pH 12.7 and an initial xanthate sulfur content of 6.75. The solution is diluted to 4% and passed through a column containing Dowex 1X4C1 ion exchange resin to exchange hydroxyl ion for chloride ion. The procedure used is that described in the patent application of Douglas J. Bridgeford Ser. No. 200,621 now Patent No. 3,291,789. The solution may, if desired, be subjected to a further cation exchange treatment to remove sodium ions. The ion exchanged starch xanthate solution has a pH of about 11. This solution is spray dried under the same conditions used in Example 11 to produce a finely divided solid starch xanthate powder containing a small amount of sodium chloride. The starch xanthate powder which is obtained from the starch xanthate solution which has been subjected to both anion and cation exchange is free of any byproduct salt.

From the above examples and from other experiments which were carried out, a number of factors were discovered to be important in the production of spray dried starch xanthate powders. Starch xanthate solutions may be spray dried at any DS ranging from a very small fraction up to the theoretical limit of 3.0. The alkali content of the starch xanthate may vary from about 0.01 to 2.0 mols per mol of starch. Generally, the alkali content should be kept at a minimum level, i.e. less than about 50% by weight of the starch and preferably at a value less than about pH 14 (measured in 20% solution). An exact critical value of alkali content cannot be stated inasmuch as the permissible amount of alkali varies with the DS and to some extent with the DP of the starch xanthate being produced. For starch xanthate solutions having a DS in excess of about 0.20 larger amounts of alkali are required in the preparation of the xanthate (unless long reaction times are used) and it is generally desirable to remove the free excess alkali by ion exchange, dialysis, weak or dilute acid neutralization, etc., prior to spray drying. For starch xanthate solutions having a DS less than about 0.20 the amount of alkali used in the preparation of the starch xanthate is generally at a level where the starch xanthate can be successfully spray dried without further neutralization. Even in this range of DS there is some advantage to a preliminary neutralization of the starch xanthate since the rate of xanthate decomposition is somewhat less in the spray dried powder where it has been given a preliminary neutralization or decausticization treatment. The size and configuration of the spray nozzle are selected to give a very fine spray. Commercially available nozzles will spray solutions of starch xanthate up to 20% concentration or higher. Another factor which has been found to be important in the production of a stable dry starch xanthate powder is the moisture content of the powder. It has generally been found that starch xanthate powders increase in storage stability with a decrease in residual moisture content. The amount of moisture that can be removed during spray drying is somewhat dependent upon the amount of alkali present in the starch xanthate solution and the removal of the free alkali generally results in the production of a starch xanthate powder having a lower moisture content. If the starch xanthate is dried under conditions which give a product having a residual moisture content less than 5% or if the spray dried powder is further treated to remove moisture the storage stability of the product is substantially improved. As previously mentioned, the spray dried starch xanthate powders may be redissolved to produce solutions of starch xanthate which can be used in any of the various fields of application which have been suggested for starch xanthate in the prior art.

While this invention has been described fully and completely with special emphasis upon several preferred embodiments, as required by the patent laws, it should be understood that within the scope of the appended claims the invention may be practiced otherwise than as specifically described herein.

What is claimed is:

1. A method of producing a storage stable starch xanthate powder which comprises spray drying a solution or slurry of starch xanthate having a pH less than 14.

2. A starch xanthate powder produced in accordance with claim 1.

3. A method in accordance with claim 1 in which the starch xanthate solution is at least partially decausticized prior to spray drying.

4. A method in accordance with claim 3 in which the starch xanthate solution is decauticized by dialysis.

5. A method in accordance with claim 3 in which the starch xanthate solution is decausticized by treatment with a weak or dilute acid solution.

6. A method in accordance with claim 3 in which the starch xanthate solution is decausticized by ion exchange with an anion exchange resin in the salt form.

7. A method in accordance with claim 3 in which the starch xanthate solution is decausticized by ion exchange with a cation exchange resin in the acid form.

8. A method in accordance with claim 1 in which the starch xanthate solution is spray dried using a sufficient volume of air at a temperature sufficient to evaporate the water from individual droplets of starch xanthate solution in the dryer without raising the temperature of the starch xanthate to a point where the xanthate is rapidly decomposed.

References Cited

UNITED STATES PATENTS 3,160,552  12/1964  Russell et al. _____ 162—146
2,825,655  3/1958  Meadows _____ 260—216 XR DONALD E. CZAJA, Primary Examiner M. T. MARQUIS, Assistant Examiner U.S. Cl. X.R.

106—213; 162—146, 175; 260—216, 233.5